Sept. 3, 1946.  L. R. BUCKENDALE  2,406,797
VEHICLE DRIVING MECHANISM
Filed April 7, 1944   2 Sheets-Sheet 1
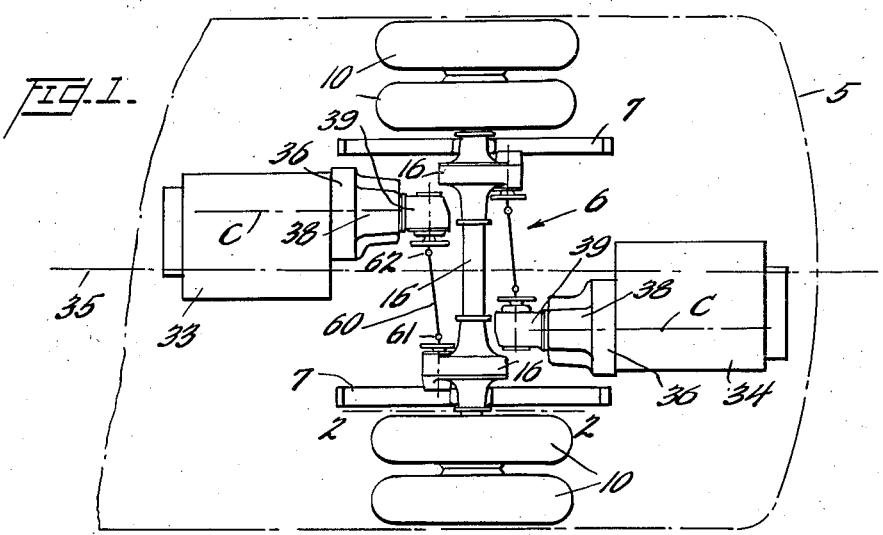
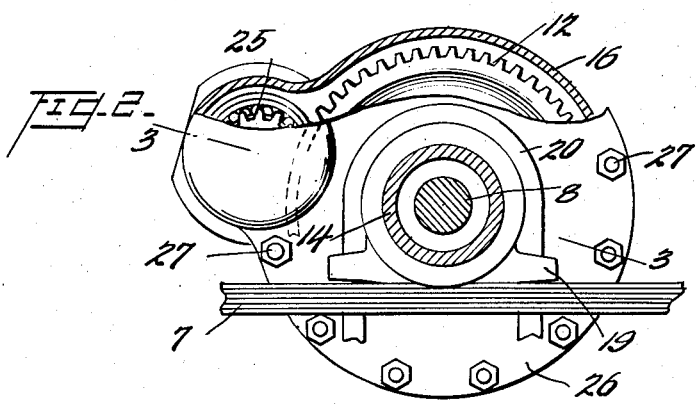
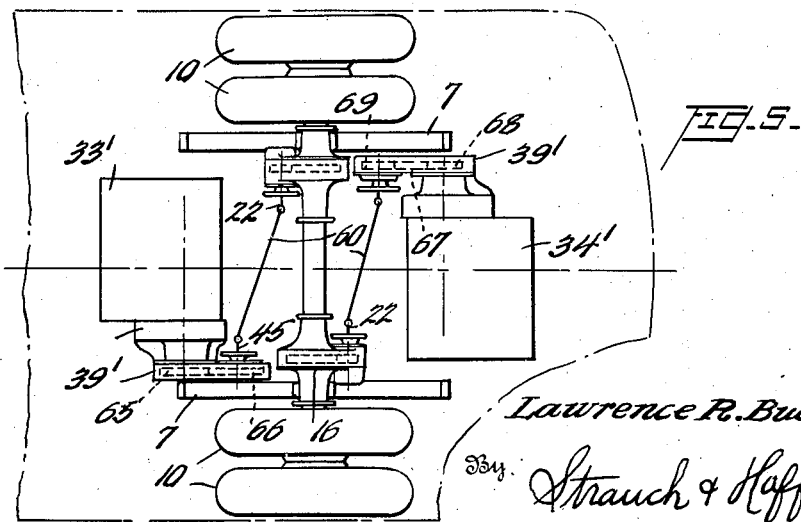
Inventor
Lawrence R. Buckendale,
By Strauch & Hoffman
Attorneys Sept. 3, 1946.  L. R. BUCKENDALE  2,406,797
VEHICLE DRIVING MECHANISM
Filed April 7, 1944  2 Sheets-Sheet 2
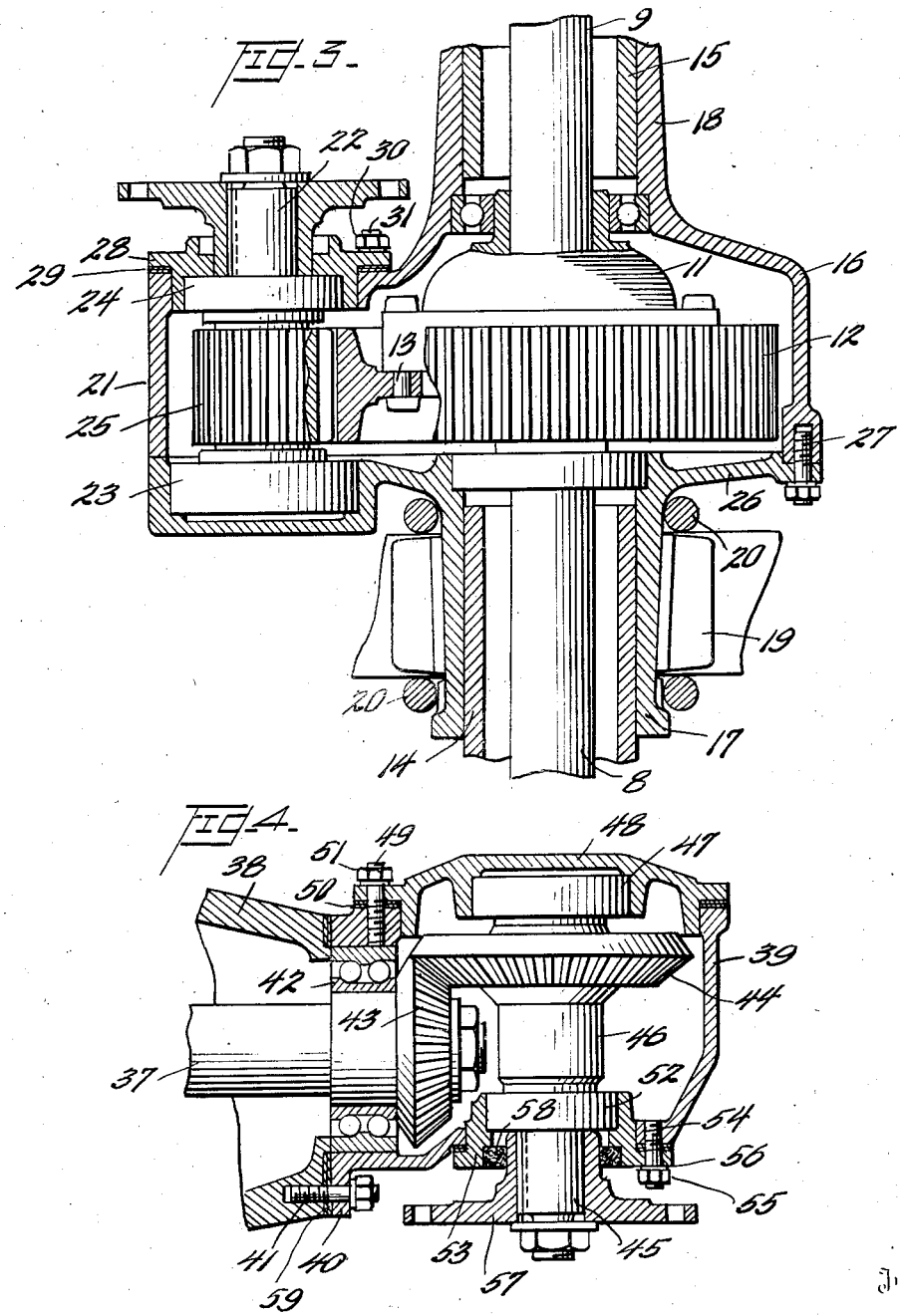
Inventor
Lawrence R. Buckendale,
By Strauch & Hoffman
Attorneys Patented Sept. 3, 1946

2,406,797

UNITED STATES PATENT OFFICE 2,406,797

VEHICLE DRIVING MECHANISM

Lawrence R. Buckendale, Detroit, Mich., assignor to The Timken-Detroit Axle Company, Detroit, Mich., a corporation of Ohio Application April 7, 1944, Serial No. 530,025

7 Claims. (Cl. 180—54)

This invention relates to vehicle driving mechanism, and more particularly to a driving mechanism for heavy duty motor vehicles such as trucks or buses, in which the power plant and vehicle axle driving unit are mounted at the rear end of the vehicle.

In vehicles of this class, it has heretofore been usual to employ a single, high powered, large size motor or engine mounted behind the rear axle of the vehicle and operatively connected by means of the transmission, power take-off and propelling means with a centrally arranged axle driving differential unit. It is well known that, when the vehicle is loaded to capacity, the fuel consumption of such high powered engines becomes excessive for the mileage covered. Also, the large size engine and its accessories occupies valuable space which might otherwise be used to increase the pay load capacity of the vehicle.

It is, therefore, the primary object and purpose of my present invention to provide a vehicle driving mechanism which is free from the above objections. To this end, I employ a pair of engines of standard size, and independent power transmitting and driving connections between each of the engines and one of a single pair of rear vehicle driving wheels.

It is another object of the invention to provide a symmetrical mounting and arrangement of the engines with their associated power transmitting units, both longitudinally and transversely of the vehicle with respect to the wheel driving axle.

A still further object of my invention is to provide driving mechanisms, individual to the respective vehicle wheels, in which the several power transmitting units are mounted and arranged relative to each other and the engine crank shaft, so that the power output of the engine will be more or less directly transmitted to the vehicle wheels, whereby the vehicle may be operated at higher speeds with capacity loads than has heretofore been possible.

It is an additional object of the invention to provide an independent power plant and driving mechanism for the respective vehicle wheels which readily lends itself to the mounting of the engine units either longitudinally or transversely of the vehicle, as the best utilization of the available space may dictate, and with substantially balanced weight distribution relative to the center of gravity, so that maximum stability will be obtained.

My invention has for a still further object to provide an independent power plant and driving mechanism for each of the vehicle driving wheels in which the several power transmitting units are of simple and rugged construction, being easily and quickly assembled or disassembled and operable to efficiently transmit the developed power of the engine or motor with minimum loss to the vehicle driving wheels.

The above and other subordinate objects of the invention are practically attained in the several embodiments thereof hereinafter described and subsequently defined in the subjoined claims with reference to the accompanying drawings.

In the drawings, wherein similar reference characters designate corresponding parts throughout the several views;

Figure 1 is a semi-diagrammatic plan view showing one desirable relative arrangement of the wheel driving engines and the respective power transmitting units associated therewith.

Figure 2 is a vertical sectional view taken substantially on the line 2—2 of Figure 1, the differential housing structure being partially shown in section.

Figure 3 is a horizontal sectional view taken substantially on the line 3—3 of Figure 2.

Figure 4 is a horizontal section through the housing of the-power-take-off unit, and Figure 5 is a semi-diagrammatic plan view, similar to Figure 1 showing an alternative mounting and arrangement of the engines and their respective power transmitting units with relation to the vehicle driving wheels and the center line of the vehicle.

With further reference to the drawings and for the present more particularly to Figure 1 thereof, for the purposes of this explanation, I have diagrammatically illustrated the rear end portion of a motor vehicle body 5, the rear wheel driving axle unit 6, and conventional spring suspension means, in the form of the familiar longitudinally extending side springs 7 of the laminated or superimposed leaf type. However, insofar as the essential features of the present invention are concerned, various other types of spring suspensions may be employed.

The axle unit 6 includes independently driven differential units 11 of conventional construction, for the respective dual-tired driving wheels 10 which are suitably fixed to the outer ends of the axle shafts 8. The outer side gears of the respective differentials are fixed to the inner ends of the wheel driving shafts 8 while the inner side gears of said differentials are connected by the intermediate shaft 9.

The axle unit 6 also includes a casing 14 for each of the wheel driving shafts 8 and a casing 15 for the intermediate shaft 9. Preferably, spur gear driving means is provided for each of the differentials 11, and, as shown in Figure 3, the ring gear 12 is rigidly bolted to the differential spider as indicated at 13 and has its teeth disposed in parallel relation to the axis thereof. Each differential unit is enclosed within a housing 16, having a tubular hub extension, 17 and 18 respectively, on each side wall thereof to telescopically receive opposing end portions of the axle casings 14 and 15 respectively.

As will be seen in Figure 1, each differential unit 11 and its housing 16 is located closely adjacent to the inner side of one of the vehicle springs 7. The hub 17 of the housing is seated in a pillow block 19 positioned on the top of the spring 7 at its approximate center, and said hub and block are securely fixed in position relative to the spring by the U-shaped bolts 20 which embrace said hub at the inner and outer sides of the spring and rigidly clamp the central part of the spring to a supporting bracket (not shown) fixed to one side rail of the vehicle underframe or chassis.

The differential housing 16 at one side thereof has an integrally formed lateral extension 21 in which the shaft 22 is journalled in the spaced anti-friction bearings 23 and 24, respectively, between which said shaft is formed with the spur pinion 25, the teeth of which are in mesh with the teeth of the differential ring gear 12. Preferably for convenient assembly, the housing 16 and extension 21 includes a detachable side or cover section 26 having hub 18, and secured to the body section of the housing by bolts 27, as shown in Figure 3. Also, the bearing 24 may be mounted in a detachable cover plate or cap 28 for an opening in the opposite side wall of the housing extension 21. One or more shim plates 29 may be positioned between the cap flange and the housing wall to properly adjust the bearings when the nuts 30 on the stud bolts 31 are tightened against said flange.

The inner end of the shaft 22 carries the universal joint connecting flange 32 for the connection of said shaft with one end of the propeller shaft, as will be presently described.

In Figure 1 of the drawings I have shown the individual power plants or engines 33 and 34, respectively, mounted forwardly and rearwardly of the axle unit 6 in the vehicle chassis, with the major portions of their mass disposed on relatively opposite sides of the vehicle center line 35, and with the crank shaft axes of said engines, indicated at C, disposed in equidistantly, transversely spaced relation from the vehicle center line. Thus the engine units are mounted or arranged, both longitudinally and transversely of the vehicle, in symmetrical relation to the axle unit 6 and the vehicle center line.

A transmission or change speed unit 36 is directly attached to one end of each engine cylinder block and extends longitudinally therefrom towards the axle unit 6 and closely adjacent to the inner side of one of the vehicle springs 7. Of course, suitable means is associated with each of the transmissions for shifting the change speed gears thereof to transmit power from the engine crank shaft to the transmission output shaft 37 at selective variable speeds.

To the end wall of the housing 38 of each transmission unit which is opposed to the axle unit 6, a power-take-off or transfer gear box 39 is attached, the attaching flange 40 thereof being detachably secured to the housing end wall by bolts 41. The end of the transmission output shaft 37 is supported in a suitable type of anti-friction bearing 42, mounted in gear box 39 and carries a bevel gear 43 splined or otherwise fixed thereto. This gear is in mesh with the bevel gear 44 splined to the shaft 45 between a central enlarged section 46 of said shaft and the inner race ring of an anti-friction bearing 47 which supports one end of the shaft 45 in a cover member 48 for one side of the gear box. The attaching flange of said cover is apertured to receive the stud bolts 49 fixed in the body wall of the gear box and one or more shims 50 may be interposed between said wall and the cap flange so that when nuts 51 on said bolts are tightened the bearing 47 will be properly adjusted.

The other end of shaft 44 is supported in the anti-friction bearing 52, mounted in the closure member 53 for an opening in the opposite side wall of the gear box, said member being detachably secured to the box wall by the stud bolts 54 and nuts 55. Bearing adjusting shims 56 are also arranged between the box wall and the attaching flange of said closure member. To the externally projecting end of said shaft, the hub of the universal joint member or flange 57 is keyed or splined and between said hub and a recessed wall of the member 53 a conventional type of oil seal 58 is arranged.

The two power-take-off units are of similar construction except that the gear 44 of the unit associated with engine 33 is located at the outer side of the gear 43 on the transmission output shaft 37 while the gear 44 of the take-off unit associated with engine 34 is located at the inner side of the gear 43. This is necessary in order that rotation shall be transmitted to shafts 45 in the same direction from the oppositely rotating engine crank shafts for the forward drive of the vehicle wheels.

In order to accurately adjust the power transfer or take-off unit and position the shaft 45 thereof with relation to the differential drive shaft 22, one or more adjusting shims 59 are positioned between the attaching flange 40 of the gear box 39 and the wall of the transmission housing 38. The shafts 22 and 45 are then connected by suitable flexible or universal joints 61 and 62, respectively, with the opposite ends of a short propeller shaft 60. As herein shown, this propeller shaft extends in a slightly diagonal transverse line between the shafts 22 and 45. It will also be understood that the latter shafts may be positioned in different horizontal planes so that the propeller shaft will be more or less vertically inclined.

In Fig. 5 of the drawings I have illustrated an alternative embodiment of the invention, in which the engines 33' and 34' are mounted in the chassis of the vehicle with their crank shaft axes disposed in vertical planes which transversely intersect the vehicle center line. In this case, also, the greater part of the engine structures are located on relatively opposite sides of the vehicle center line. As herein shown, a transmission and power-take-off assembly is mounted on the left hand end of the forward engine 33', and a similar assembly is mounted on the right hand end of the rear engine 34'. The power transfer gear boxes 39' are of shallow elongated form and extend longitudinally from the respective transmissions, closely adjacent the inner side of the respective vehicle springs 7, to a point adjacent to the housings of the respective differential units 11. In addition to the spur gear drive for the differential units, I also use a spur gear driving connection between the transmission output shaft and the power-take-off shaft 45. Thus in the case of the power-take-off unit which is associated with the front engine 33', a spur gear 65 on the transmission output shaft directly meshes with the spur gear 66 on power-take-off shaft 45. As the engine crank shafts rotate in opposite directions power is transmitted from the transmission output shaft associated with the rear engine 34' to the power-take-off 45 through the spur gear 67 interposed between the gears 68 and 69 fixed to the transmission output and take-off shafts, respectively.

In this case, the drive shaft 22 of the differential driving unit for the right vehicle wheel is located forwardly of the axle unit 6, while the differential drive shaft 22 for the differential unit associated with the left vehicle wheel is located at the rear side of the vehicle axle unit. The respective power-take-off shafts 45 at the front and rear sides of the vehicle axles are connected with the corresponding differential drive shafts 22 by the propeller shafts 60, as in the previously described construction. However, it will be noted that, due to the relative location of said shafts 22 and 45 longitudinally of the vehicle, the propeller shafts have a somewhat greater transverse diagonal inclination than in Figure 1.

From the above description, it will be seen that in each embodiment of my invention I provide a longitudinally and transversely symmetrical arrangement of the independent wheel driving engines and associated power transmission mechanisms so that a substantially balanced distribution of the weight upon the driving wheels is obtained, with maximum stability and tractive effort of the driving wheels on the road surface.

By the provision of an independent power plant for each driving wheel, such heavy duty vehicles may be operated at high speeds with maximum pay loads, thus offsetting the greater fuel consumption. Owing to the very closely coupled relation between the engine crank shaft and the wheel driving shaft power losses are reduced to a minimum and a very high percentage of the power output of the engine is effectively utilized. It will further be noted that my invention provides a very compact assembly of the standard small size engines and associated power transmitting units, which can be operatively mounted in the vehicle chassis without seriously encroaching upon the cargo space of the vehicle. Of course, the vehicle body at its opposite sides and rear end will be provided with suitable openings for the servicing of the power plants.

It will further be apparent that the several elements of my invention as above described are of simple and rugged structural form, efficient and reliable in functional operation, and can be readily disassembled and reassembled for the purposes of inspection and repair.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a pair of vehicle driving wheels, a connecting axle unit between said wheels including independently operable driving differentials for said wheels on relatively opposite sides of the vehicle center line, a pair of engines mounted in the vehicle frame at relatively opposite sides of said axle unit, power transfer means associated with each engine comprising a power-take-off unit at the opposite side of the vehicle center line from one of said differentials and having a power output shaft in closely adjacent relation to the other differential, and propelling means individual to the respective engines operatively connecting the said power output shafts to the respective differentials.

2. The combination defined in claim 1 in which said propelling means includes drive shafts for the respective differentials disposed on relatively opposite sides of the axle unit, each drive shaft being in substantially parallel relation with the power output shaft at the corresponding side of said axle unit and with its axis in a vertical plane disposed transversely of said vehicle and located between said axle unit and the power output shaft, and wherein spur gear driving connections are provided between said drive shafts and the respective differentials.

3. The combination defined in claim 1 including a power shaft driven by each engine and in which said propelling means includes drive shafts for the respective differentials disposed on relatively opposite sides of the axle unit, in substantially parallel relation with the power output shaft at the corresponding side of said axle unit, and wherein spur gear driving connections are provided between each engine power shaft and the associated power output shaft and between said drive shaft and the associated differential.

4. In combination with a pair of vehicle driving wheels, a connecting axle unit between said wheels including spaced driving differential mechanisms connected to each other and to the respective wheels and arranged on the corresponding side of the longitudinal vehicle center line, a drive shaft for each differential mechanism, one of said drive shafts being disposed forwardly of the axle unit and the other rearwardly thereof in parallel relation therewith, engines mounted respectively at the front and rear of said axle unit with their respective crank shafts on the opposite side of the vehicle center line with relation to the front and rear drive shafts, and separate power transmitting connections between the front and rear engine crank shafts and the respective drive shafts.

5. In combination with a pair of vehicle driving wheels, a connecting axle unit between said wheels including spaced driving differential mechanisms connected to each other and to the respective wheels and arranged on the corresponding side of the vehicle center line, a drive shaft for each differential mechanism, one of said drive shafts being disposed forwardly of the axle unit and the other rearwardly thereof, engines mounted respectively at the front and rear of said axle unit, a power-take-off unit associated with each engine and positioned in adjacent succession with one of the differential mechanisms longitudinally of the vehicle and on the opposite side of the vehicle center line with relation to the drive shaft for the other differential mechanism, and propelling means individual to said engines operatively connecting said power-take-off units with the corresponding drive shafts.

6. In combination with a pair of vehicle driving wheels, a connecting axle unit between said wheels including spaced driving differential mechanisms connected to each other and to the respective wheels and arranged on the corresponding side of the vehicle center line, a drive shaft for each differential mechanism, one of said drive shafts being disposed forwardly of the axle unit and the other rearwardly thereof, engines mounted respectively at the front and rear of said axle unit with their crank shafts disposed in substantially parallel relation to the vehicle center line, power-take-off shafts associated with said engines and disposed respectively on the opposite sides of the vehicle center line with relation to said front and rear drive shafts in substantially parallel relation thereto, and a propeller shaft between each engine and the axle unit, said shafts being disposed in transversely diagonal vertical planes, and connecting the corresponding power-take-off and drive shafts at the front and rear of the axle unit with each other.

7. In combination with a pair of vehicle driving wheels, a connecting axle unit between said wheels having spaced driving differential mechanisms connected to each other and to said wheels disposed on opposite sides of the longitudinal vehicle center line, an engine, a transmission and a power take-off device assembled in longitudinal succession both forwardly and rearwardly of the axle unit, with the power take-off device of each assembly disposed closely adjacent to one of the differential mechanisms and having a power output shaft at substantially right angles to the engine crank shaft, and propelling means operatively connecting each power output shaft with the differential mechanism at the opposite side of the vehicle center line.

LAWRENCE R. BUCKENDALE.